United States Patent
Sugden

(12) 
(10) Patent No.: US 6,364,772 B1
(45) Date of Patent: Apr. 2, 2002

(54) DISCONNECT FOR HIGH-SPEED ROTATING SHAFTS

(75) Inventor: Kenneth Sugden, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/643,521

(22) Filed: Aug. 22, 2000

(51) Int. Cl.[7] .................................. F16D 9/00
(52) U.S. Cl. .................. 464/31; 464/901; 464/149; 464/158; 464/26; 165/96
(58) Field of Search ............... 165/96; 464/26, 464/31, 901, 149, 158

(56) References Cited

U.S. PATENT DOCUMENTS

| | | |
|---|---|---|
| 3,675,444 A | 7/1972 | Whipple |
| 3,889,789 A | 6/1975 | Boebringer |
| 4,086,991 A | 5/1978 | Swadley |
| 4,271,947 A | 6/1981 | Gaeckle |
| 4,281,942 A * | 8/1981 | Gaeckle et al. ............... 403/38 |
| 4,537,578 A | 8/1985 | Sharpe et al. |
| 4,934,977 A | 6/1990 | Falconer et al. |
| 5,103,949 A | 4/1992 | Vanderzyden et al. |
| 5,793,929 A | 8/1998 | Taylor |
| 5,946,448 A | 8/1999 | Taylor |

\* cited by examiner

Primary Examiner—Lynne H. Browne
Assistant Examiner—Aaron Dunwoody
(74) Attorney, Agent, or Firm—Hamilton Sundstrand Corp.

(57) ABSTRACT

A self-actuating thermal disconnect disengages two coaxially aligned shafts if equipment driven by one of the shafts overheats. The disconnect uses the centrifugal force of a molten material as the principal actuation. The disconnect end of a drive shaft has a means for transmitting torque. A disconnect piston having first and second ends is axially movable in a splined cylinder within the driven shaft. In normal operation, a solid mass of fusible material is disposed in the disconnect piston within a cavity defined by the second end of the disconnect piston and an adjacent end of a cavity piston. A means for transmitting torque at the first end of the disconnect piston couples with the means for transmitting torque at the first end of the drive shaft. If the driven equipment overheats, the molten fusible material bursts out under centrifugal force through the channels. This action drives the disconnect piston away from the drive shaft, thereby disconnecting the drive shaft from the disconnect piston and hence from the driven shaft. Further, the molten material remains within the disconnect to facilitate cleaning, replacement, and rebuilding.

12 Claims, 4 Drawing Sheets

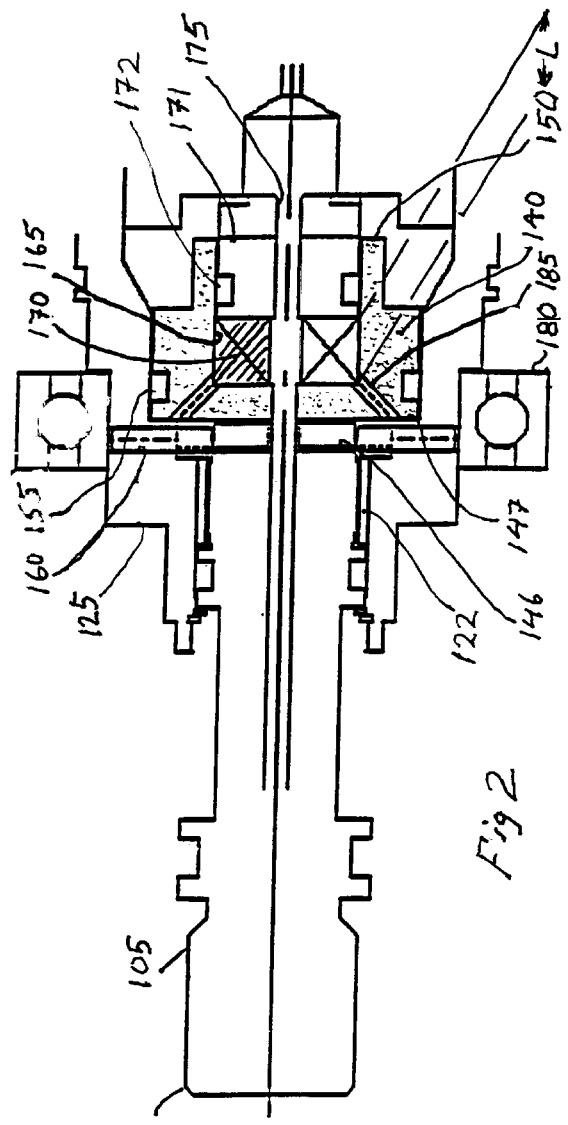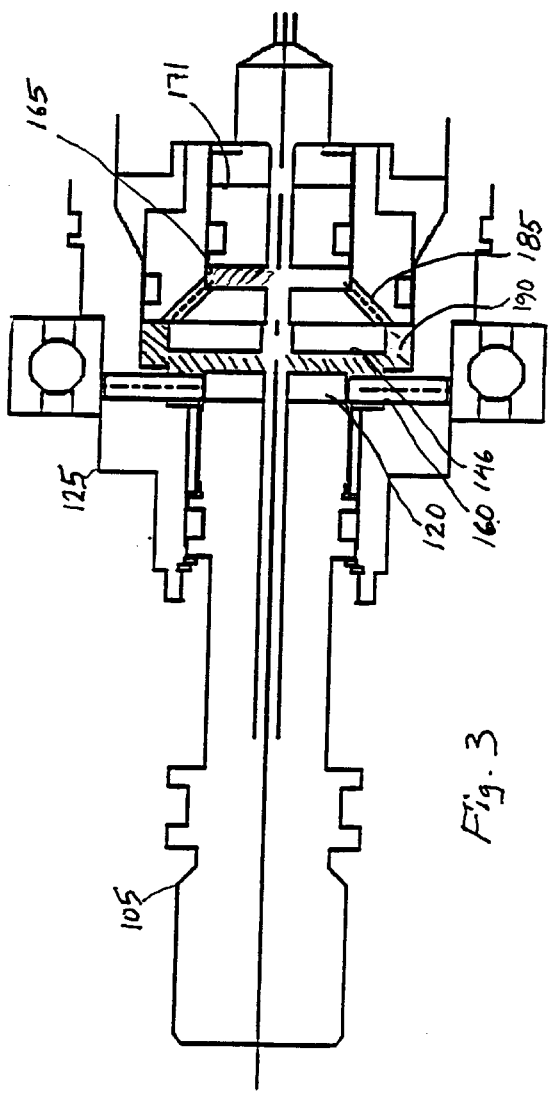

DISCONNECT FOR HIGH-SPEED ROTATING SHAFTS

FIELD OF THE INVENTION

The invention relates generally to a disconnect coupling, and more particularly to a self-actuating coupling for disconnecting a high-speed rotating drive shaft from a coaxially aligned driven shaft in case of an over-temperature.

BACKGROUND OF THE INVENTION

In mechanical or electro-mechanical systems, frequently a driven shaft is powered by a coaxially aligned, abutting drive shaft. Thermal disconnect couplings have been used to protect components powered by the driven shaft by responding to a predetermined high temperature. The couplings, also known simply as "disconnects," interrupt the torque transfer between the driven components and the source of motive power. That is, these couplings disconnect or disengage the driven shaft from the drive shaft under certain operating conditions.

In aircraft, typical devices that require thermal disconnect protection are auxiliary equipment such as electric generators. Generators are driven by the aircraft main engines or by an auxiliary power unit (APU). Frequently generators are driven through hydromechanical transmissions such as constant speed drives (CSDs) or variable speed, constant frequency (VSCF) drives. The drive and the generator may be integrated, as in an integrated drive generator (IDG). A thermal disconnect is typically disposed between the engine or APU and the CSD or VSCF drive. The disconnect is cooled and lubricated by a fluid, such as hydraulic oil. This oil may be the same as the CSD, generator, or engine gearbox oil, or it may come from a separate supply.

If the equipment overheats, causing the temperature of the lubricating fluid (henceforth "oil") to exceed a predetermined value, the disconnect breaks the connection between the engine or APU and the CSD or VSCF drive. In case of malfunction of a generator, such as loss of lubrication or failure of parts, the rotor of the generator may overheat. In addition, inadvertent overfilling of oil may cause overheating. In turn, this may open a dump valve in some generators, which is a safety device. Then the generator condition would change from too much oil to too little oil. This could cause a thermal failure of the generator. If the drive shaft were still transmitting high-speed torque to the generator, it would likely self-destruct and damage nearby equipment as it flew apart.

Thus, it is advantageous to include a thermal disconnect for automatically discontinuing operation of equipment when it overheats. The time the aircraft is out of service is then minimized while the equipment is repaired or replaced.

The drive shaft and the driven shaft are most frequently coupled at the disconnect by teeth, splines, or similar mechanical features. Such disconnects allow one shaft to move axially relative to the other, thereby disconnecting the two shafts from one another when an over-temperature condition occurs. Not only is damage to the drive and the generator thereby reduced, but also secondary damage to surrounding equipment may be prevented. Thus a thermal disconnect may be an important safety device.

In some prior designs, the thermal disconnect was constrained under normal conditions by a mass of eutectic as well as the mechanical features mentioned herein before. The term "eutectic" refers to an alloy or solution that melts at the lowest possible, constant temperature. For example, many mixture ratios of lead and tin alloy (solder) are possible, but only one ratio of the two metals is the eutectic. Eutectics also have the desirable property that they transition at a sharp melting point from solid to liquid without becoming plastic or viscous in between. Eutectics may be alloys of other metals, but various alloys of silver, lead, and tin are often used. With those three metals, eutectics can be made with melting points between 179° C. and 310° C.

Eutectics used in prior disconnects were chosen to have melting points that corresponded with the maximum allowed temperature of the oil. In normal operation, the eutectic was solid. When the predetermined high temperature was exceeded, the eutectic liquefied suddenly and was able to flow elsewhere. This flow then triggered the springs or other mechanical features to actuate the disconnect.

Angularity built into the drive surfaces of splines or clutch teeth, as well as springs, pawls, and solenoids were used in conjunction with eutectics to disconnect a driven shaft from a drive shaft. However, angled splines on the shaft are required to be relatively large to transmit the torque that is involved. Springs require considerable space within the thermal disconnect, typically several cubic inches. Pawls also occupy space, add weight, and work better at speeds lower than typically encountered by aircraft generators. Solenoids actuated manually by a cockpit switch or automatically by sensors have been used as triggers as well. Solenoids may corrode and jam, however, or the wires that energize them may melt from the same over-temperature problem that requires the disconnect to operate.

The use of disconnects for protection implies that components will be cleaned and rebuilt. In some of the prior art, molten material migrated within the disconnect or to adjacent areas after it was actuated. This migration made it difficult to clean up the disconnect and surrounding equipment. In addition, cold flow of relatively soft fusible materials sometimes used was a problem on some designs. That is, the material could migrate without melting because of the forces on it. In such prior designs, the forces were required to be large to ensure that the disconnect would separate under the large frictional loads that could be encountered.

On many modern engines, generators, and gearboxes, the rotational speeds are designed to be higher than they were in decades past. Higher speeds require less torque and smaller, lighter parts. For example, four-cylinder automobile engines idle faster than typical eight-cylinder, larger-displacement engines did some years ago. The same is true of aircraft components. Many aircraft generators and some CSD and VSCF drives take advantage of high drive speeds. A thermal disconnect should therefore operate optimally for high-speed shafts, and in fact take advantage of the high rotational speed in its operation.

DISCLOSURE OF THE INVENTION

Accordingly, it is an object of this invention to provide means for disconnecting a driven device from a drive shaft when the device or its lubricating oil exceeds a predetermined temperature.

Another object is to disconnect a driven device from a drive shaft using the centrifugal force of a molten eutectic as a principal actuating force.

Yet another object is to provide a thermal fuse that allows full torque transfer below a predetermined temperature but no torque transfer above that temperature.

Still another object is to create a thermally actuated disconnect without using springs or other mechanical devices to provide the principal actuating force.

It is another object of the invention to create a disconnect that can confine molten eutectic and thereby require less clean up after an over-temperature incident.

It is yet another object to provide a thermal disconnect with simpler and fewer parts.

It is still another object to reduce the size and the weight of the disconnect.

A major step in the invention is the recognition that the centrifugal force of a molten material, preferably eutectic solder, is sufficient to provide the principal force needed to disconnect a driven shaft from a drive shaft.

According to the invention, a drive shaft is disconnected or disengaged from a coaxially aligned driven shaft by the centrifugal force of a molten fusible material, wherein the molten material provides the principal force needed to disconnect the shafts, the material melts at a predetermined temperature, and the material remains confined within the disconnect.

The invention has the benefit that it may prevent the damage to, or destruction of, equipment. The invention may prevent subsequent likely secondary damage to surrounding equipment. The invention is self-actuating, reducing both the chance for human error and for failure of sensors and electrical devices. Thus, the invention may reduce the maintenance and increase the safety of an aircraft.

The above and other objects, features, and advantages of this invention will become apparent when the following description is read in conjunction with the accompanying drawings.

BRIEF DESCRIPTION OF THE DRAWINGS

FIG. 2 is a vertical cross-section view of the shafts and disconnect of FIG. 1 before the disconnect is actuated by over-temperature, taken along the lines A—A of FIG. 1;

FIG. 3 is the vertical cross-section view of the shafts and disconnect of FIG. 1 after the disconnect is actuated by over-temperature, taken along the lines A—A of FIG. 1;

DETAILED DESCRIPTION OF THE PREFERRED EMBODIMENTS

Figure 1:
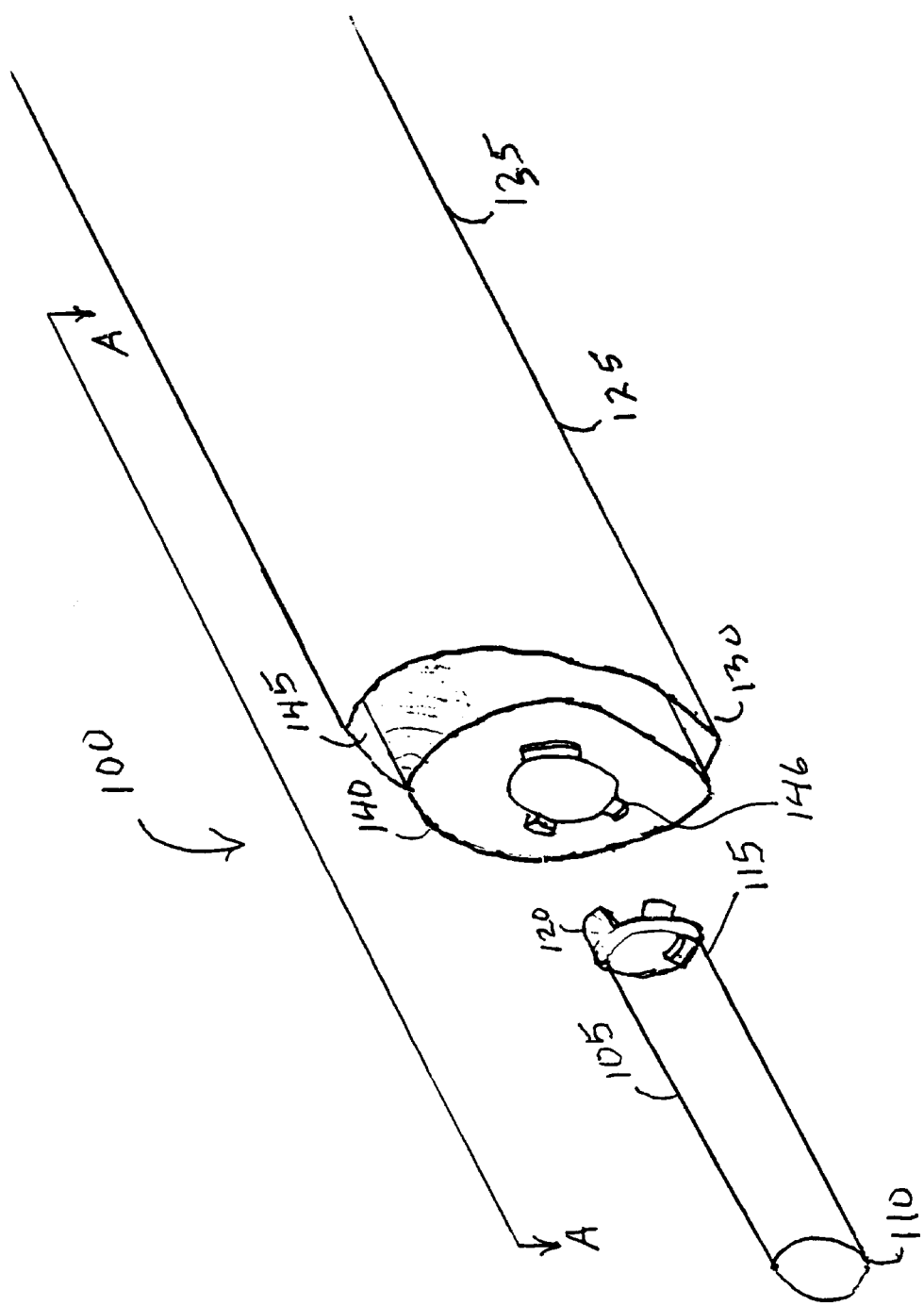
FIG. 1 is a partial, exploded isometric view of a drive and a driven shaft interfacing at one embodiment of a disconnect.

One embodiment of a thermal disconnect 100 is partially illustrated in FIG. 1. A smaller-diameter shaft 105 has first end 110 and second end 115. The second end, which terminates in clutch teeth 120, is supported by overrunning bearing 122. The larger-diameter shaft 125 has a first end 130 and a second end 135. The first end 130 contains a disconnect piston 140 that is movable in a coaxial cylindrical space 145. Clutch teeth 146 are disposed on the face of piston 140 that mesh with the clutch teeth 120 on the end 115 of the smaller-diameter shaft 105.

Typically, the smaller-diameter shaft 105 is the drive shaft, supplying torque from the aircraft engine or APU, and the larger-diameter shaft 125 is the driven shaft. The driven shaft may directly power a generator (not shown), or power a constant speed drive (CSD) (not shown) or a variable speed, constant frequency (VSCF) drive (not shown). The drive and the generator may be integrated, as in an integrated drive generator (IDG) (not shown). The surrounding housing, bearings, and O ring grooves that would enable the shafts to rotate are not shown in FIG. 1, but should be apparent to one of ordinary skill in the art.

In FIG. 2 is shown the normal operating position of the thermal disconnect in vertical cross-section. Disconnect piston 140 has first and second ends 147,150, and an O ring groove 155 that positions an O ring (not shown). The clutch teeth 146 on the first end 147 mesh with radial pins 160, which are part of the larger-diameter shaft 125, as well as with the clutch teeth 120 on the drive shaft 105. In this manner, torque is transmitted from the small shaft 105 to the disconnect piston 140 to the larger shaft 125.

Internal to shaft 125, disposed within the disconnect piston 140, is a cylindrical cavity 165. The cavity is filled with eutectic solder 170. The cavity 165 lies between the second end 150 of the disconnect piston 140 and a cavity piston 171. Piston 171 is sealed by an O ring 172. A passage for lubrication 175 is disposed through the center of the mass of solder 170, so that the solder is in the shape of an annulus. The cavity 165 has an axial dimension L, which must be at least as long as the clutch teeth to allow the disconnect to separate.

During normal operation, the clutch teeth 120,146 and the pins 160 are engaged, and the eutectic solder 170 is solid. The drive shaft 105 from the aircraft engine or APU transfers the full torque to the shaft 125 of the generator, transmission, or IDG. Bearings 180 allow the shaft 125 to rotate.

Referring now to FIG. 3, the thermal disconnect is illustrated after it exceeds a predetermined temperature, defined as an over-temperature condition. This condition can result from a variety of malfunctions, such as loss of lubrication in the IDG or the generator. The shafts 105,125 are rotating at very high speed, between approximately 15,000 and 30,000 rpm. The eutectic solder 170 in cavity 165 liquefies suddenly due to the over-temperature, without becoming viscous or plastic first. The liquid eutectic is then transmitted by centrifugal force through passages 185, which are symmetrically arranged for balance around the shaft axis. The liquid bursts outward into the area 190 between the disconnect piston 140 and the shaft 105.

The preferred eutectic solders are heavy metal alloys, e.g., specific gravities of approximately 8–11, or 8–11 times the density of water or oil. Centrifugal force pushes the dense solder out through the passages 185 with sufficient force to disengage the clutch teeth 146 from the pins 160 and the teeth 120 on the drive shaft 105. Depending upon the geometry and speed, the disengaging force may be between approximately 60 and 280 pounds, at a pressure between approximately 250 and 1200 pounds per square inch.

This force moves the disconnect piston 140 quickly away from shaft 105. The cavity 165, having lost most of the solder, becomes compressed between the disconnect piston and the cavity piston 171. Now the cavity 165 has an axial length considerably smaller than L. The shafts 105,125, which are supported by bearings, do not move relative to each other; the newly created gap between the clutch teeth 146 and the pins 160 equals the amount that the dimension L is decreased.

Thus, centrifugal force alone has the capability to disengage the self-actuating thermal disconnect. The eutectic solder remains in the cavity 190, thereby preventing further possible damage. The cavity piston 171 and O ring 172 confine the remaining molten eutectic in the cavity 165.

Unlike the prior art, the melting eutectic does not actuate springs, pawls, or other devices to separate the shafts. It is the mass of liquid eutectic, driven by the centrifugal forces, that moves the disconnect piston, thereby disengaging the shafts. The invention utilizes the higher speed of modern aircraft drives and generators to advantage.

Some available eutectic solders and their melting temperatures are as follows:

| Tin (Percent) | Lead (Percent) | Silver (Percent) | Melting Temperature (° C.) |
|---|---|---|---|
| 63 | 37 | — | 183 |
| 62.5 | 36.1 | 1.4 | 179 |
| 96 | — | 4 | 221 |
| — | 97.5 | 2.5 | 305 |
| 0.75 | 97.5 | 1.75 | 310 |

The solder is chosen to have a melting point that corresponds with the maximum allowed temperature of the oil in the generator or IDG, the temperature at which the designer wishes the thermal disconnect to disengage.

Figure 4:
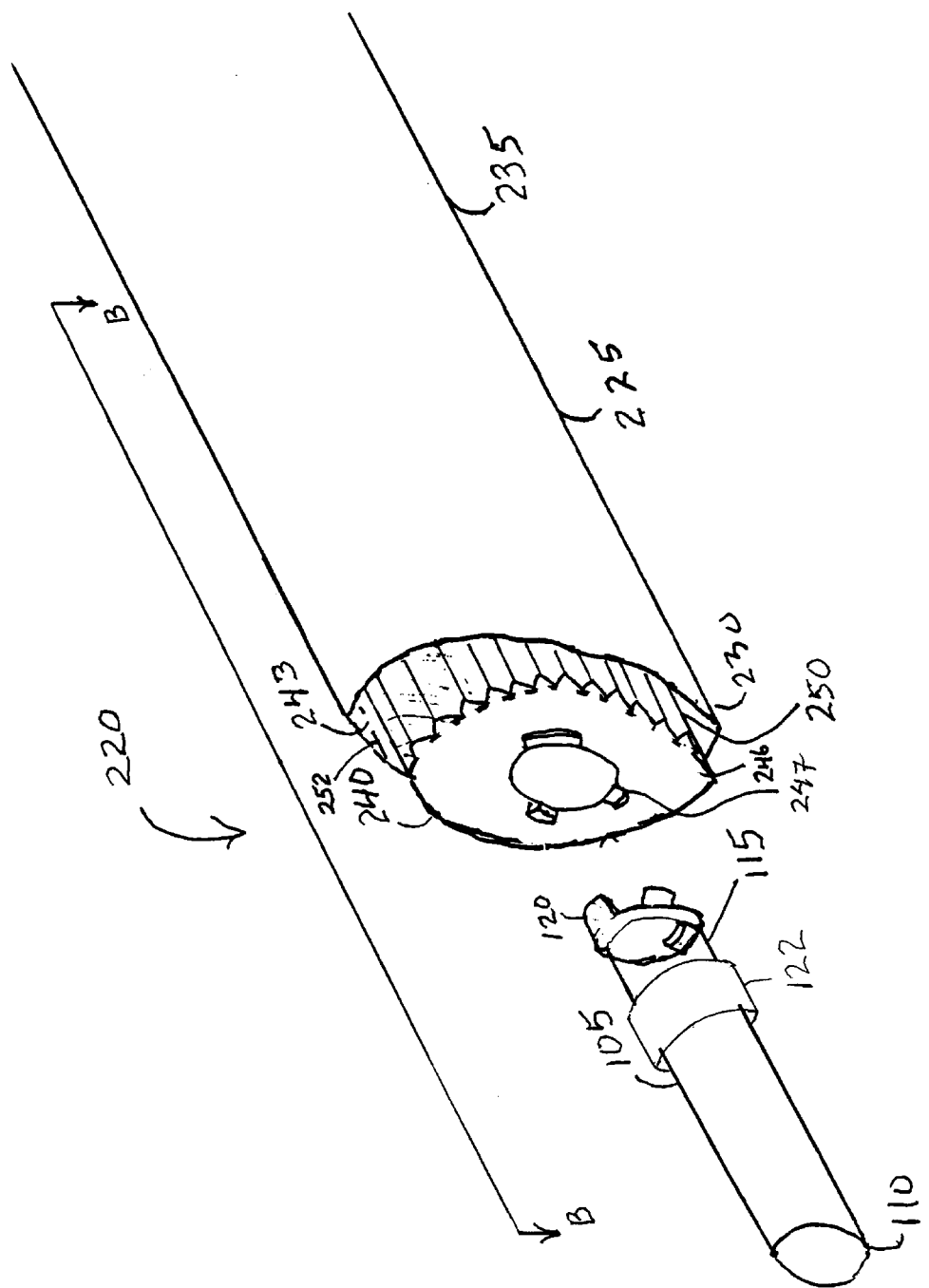
FIG. 4 is a partial, exploded isometric view of a drive and a driven shaft interfacing at a second embodiment of a disconnect.

A second and preferred embodiment of a thermal disconnect 220 is partially illustrated in FIG. 4. A smaller-diameter shaft 105 has first end 110 and second end 115. The second end, which terminates in clutch teeth 120, is supported by overrunning bearing 122.

A larger-diameter shaft 225 has a first end 230 and a second end 235. The first end 230 contains a disconnect piston 240 that is movable in a coaxial cylindrical space 243. The disconnect piston has splines 250 that mesh with the splines 252 on shaft 225 in the space 243. An end 246 of the disconnect piston adjacent to shaft 105 terminates in clutch teeth 247.

The smaller-diameter shaft 105 is the drive shaft, supplying torque from the engine or APU (not shown), and the larger-diameter shaft 225 is the driven shaft. The surrounding housing and related parts that would enable the shafts to rotate are not shown in FIG. 4, but should be apparent to one of ordinary skill in the art.

Figure 5:
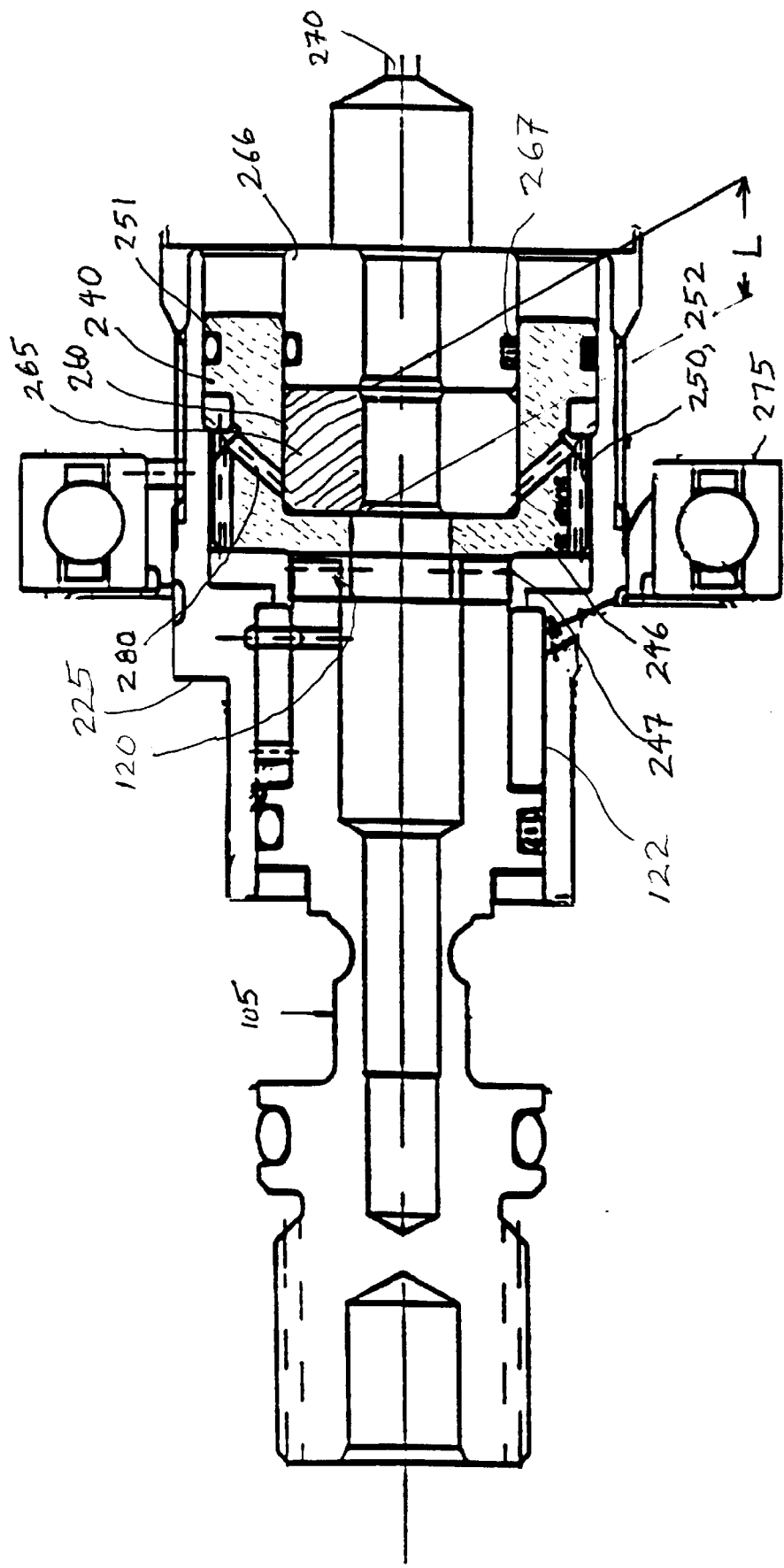
FIG. 5 is a vertical cross-section view of the shafts and disconnect of FIG. 4 before the disconnect is actuated by over-temperature, taken along the lines B—B of FIG. 4.

In FIG. 5 is shown the normal operating position of the thermal disconnect 220 of FIG. 4 in cross-section. Disconnect piston 240 has an O ring groove 251 that positions an O ring (not shown). The end 246 has clutch teeth 247 that mesh with teeth 120 on the smaller-diameter shaft 105. Disposed within shaft 225 and disconnect piston 240 is an annular cavity 260 that is filled with eutectic solder 265. The cavity 260 lies between the disconnect piston 240 and a cavity piston 266, which is sealed with an O ring 267. A passage for lubrication 270 is disposed through the center of the mass of solder. The cavity 260 has an axial dimension L, which must be at least as long as the clutch teeth to allow the disconnect to separate.

In the normal operating condition, the splines 250 mesh with the splines 252. The eutectic solder 265 is solid. The disconnect piston 240 cannot rotate with respect to the shaft 225 because of the spline connection, and shaft 225 and the piston are locked to shaft 105 by the clutch teeth connection. The drive shaft 105 transfers the full torque to the driven shaft 225. Bearings 275 allow the shaft 225 to rotate.

If the disconnect exceeds some predetermined high temperature, the eutectic 265 in cavity 260 liquefies suddenly, without first becoming viscous. The liquid eutectic is then transmitted by centrifugal force through passages 280, which are axially symmetric for balance. The liquid bursts outward into the area where the splines mesh. This action causes the disconnect piston 240 to be driven axially away from the shaft 105 with splines 250 sliding along mating splines 252. This axial motion disengages the clutch teeth 247,120. Unlike the first embodiment 100 as illustrated in FIGS. 2 and 3, the passages 280 carry the solder diagonally away from the shaft 105. The direction of the solder flow is not essential to the invention.

Typically, eutectic solders are heavy metal alloys that have specific gravities of approximately 8–11, or 8–11 times the density of water or oil. The dense solder bursts out through the passages 280 with sufficient force to cause the splines 250,252 to slide axially, thereby disengaging the clutch teeth. Depending upon the geometry and speed, the disengaging force may be between approximately 60 and 280 pounds, at a pressure between approximately 250 and 1200 pounds per square inch. This force drives the disconnect piston away from the shaft 105. The cavity 260, having lost most of the solder, becomes compressed between the disconnect piston and the cavity piston, and now has an axial length considerably smaller than L. The shafts 105,225, which are supported by bearings, do not move relative to each other; the newly created gap between the disconnect piston and shaft 105 equals the amount that the dimension L is decreased. The cavity 260 is prevented from leaking solder from the end opposite shaft 105 by cavity piston 266 and its O ring 267.

Some available eutectic solders and their melting temperatures are as follows:

| Tin (Percent) | Lead (Percent) | Silver (Percent) | Melting Temperature (° C.) |
|---|---|---|---|
| 63 | 37 | — | 183 |
| 62.5 | 36.1 | 1.4 | 179 |
| 96 | — | 4 | 221 |
| — | 97.5 | 2.5 | 305 |
| 0.75 | 97.5 | 1.75 | 310 |

The solder is chosen to have a melting point that corresponds with the maximum allowed temperature of the oil in the equipment, the temperature at which the designer wishes the thermal disconnect to disengage.

Thus, centrifugal force alone has the capability to disengage the clutch teeth of the self-actuating thermal disconnect, thereby disconnecting the shafts. The invention utilizes the higher speed of modern aircraft drives and generators to advantage. The eutectic solder remains in the area between the splines. The solder does not migrate into the equipment, thereby preventing possible further damage. Unlike the prior art, the melting eutectic does not actuate springs, pawls, or other devices to separate the shafts. It is the mass of liquid eutectic, driven by the centrifugal forces of high-speed rotation, that moves the disconnect piston and disengages the shafts.

It should be understood by one with ordinary skill in the art that this thermal disconnect can be used on equipment other than aircraft generators or transmissions. The invention can be used on land-based generators. In fact, it can be used on any rotating machinery that operates at sufficiently high speed to produce the required centrifugal force on the fusible or eutectic material. Furthermore, it should be understood that this design can be used on relatively smaller as well as larger equipment. The molten material need not be a eutectic for this design to function. Depending on the shaft speed and density of the material needed to produce the force, wax that melts at a predetermined temperature may be used, for example.

All of the foregoing changes are irrelevant. It suffices for the present invention that a drive shaft is disconnected from a coaxially aligned driven shaft by the centrifugal force of a molten fusible material, wherein the molten material provides the only force needed to disconnect the shafts. Furthermore, the material melts at a predetermined temperature, and the material remains contained within the disconnect.

I claim:

1. A coupling for disconnecting a rotating drive shaft from a coaxially aligned and abutting driven shaft, each shaft having first and second ends, the coupling comprising:
    a first means for transmitting torque disposed at the first end of the drive shaft;
    a disconnect piston with first and second ends axially movable in a coaxial cylinder within the first end of the driven shaft having a generally cylindrical internal cavity extending to the second end and internal passages radiating outward from the cavity toward the first end;
    a cavity piston fixed within the cavity in the disconnect piston, the cavity piston having an end adjacent to the second end of the disconnect piston;
    a mass of fusible material disposed within the cavity in the disconnect piston;
    a pin mounted radially within and attached to the first end of the driven shaft; and
    a second means for transmitting torque disposed at the first end of the disconnect piston that couples with both the first torque transmitting means and the pin, whereby the motion of the molten fusible material under centrifugal force through the Usages disconnects the drive shaft from the disconnect piston and the driven shaft.

2. The coupling of claim 1, wherein the cavity containing the fusible material is an annulus.

3. The coupling of claim 1, wherein the fusible material is a eutectic alloy.

4. The coupling of claim 3, wherein the eutectic alloy is an alloy of lead, tin, and silver.

5. The coupling of claim 1, wherein the fusible material is a wax.

6. The coupling of claim 1, wherein the first torque transmitting means is a combination of clutch teeth and the pin.

7. A coupling for disconnecting a rotating drive shaft from a coaxially aligned and abutting driven shaft, each shaft having first and second ends, the coupling comprising:
    a first means for transmitting torque disposed at the first end of the drive shaft;
    a disconnect piston with first and second ends axially movable in a coaxial cylinder within the first end of the driven shaft hating a generally cylindrical internal cavity extending to the second end and internal passages radiating ad from the cavity toward the first end, and slidably connected to the driven shaft by splines;
    a cavity piston fixed within the cavity in the disconnect piston, the cavity piston having an end adjacent to the second end of the disconnect piston;
    a mass of fusible material disposed within the cavity in the disconnect piston; and
    a second means for transmitting torque disposed at the first end of the disconnect piston that couples with the first torque transmitting means, whereby the motion of the molten fusible material under centrifugal force through the passages disconnects the drive shaft from the disconnect piston and the driven shaft.

8. The coupling of claim 7, wherein the cavity containing the fusible material is an annulus.

9. The coupling of claim 7, wherein the fusible material is a eutectic alloy.

10. The coupling of claim 9, wherein the eutectic alloy is an alloy of lead, tin, and silver.

11. The coupling of claim 7, wherein the fusible material is a wax.

12. The coupling of claim 7, wherein the first torque transmitting means is clutch teeth.

* * * * *